United States Patent
Liou

[11] Patent Number: 6,031,812
[45] Date of Patent: Feb. 29, 2000

[54] OPTICAL PICKUP ACTUATOR WITH MAGNETIC LEVITATION STRUCTURE

[75] Inventor: Jiin-Song Liou, Miao-Li, Taiwan

[73] Assignee: Industrial Technology Research Institute, Hsinchu, Taiwan

[21] Appl. No.: 09/033,869

[22] Filed: Mar. 3, 1998

[30] Foreign Application Priority Data

Oct. 30, 1997 [TW] Taiwan ................................ 86218372

[51] Int. Cl.$^7$ ................................................. G11B 17/00
[52] U.S. Cl. ................................................................ 369/244
[58] Field of Search ....................................... 369/244, 251, 369/44.14, 44.15, 44.22; 359/819, 823, 824

[56] References Cited

U.S. PATENT DOCUMENTS

| | | | |
|---|---|---|---|
| 4,792,935 | 12/1988 | Kime et al. | 369/44.22 |
| 4,998,802 | 3/1991 | Kasuga et al. | 369/44.22 |
| 5,659,525 | 8/1997 | Miyamae et al. | 369/44.22 |
| 5,844,881 | 12/1998 | Kasuga et al. | 369/244 |

*Primary Examiner*—Allen T. Cao

[57] ABSTRACT

An optical pickup actuator with a featured magnetic-levitation structure is provided. The magnetic-levitation structure is devised in particular to cause the actuator to be restored to and then remain stably at a neutral position after a focusing and tracking operation is completed. The actuator includes a lens holder for holding an objective lens; a shaft axially coupled to the lens holder; a plurality of magnets for producing magnetic fields; and coil member that can interacts with the magnetic fields from the magnets perform the focusing and tracking actions. In addition, the actuator includes a magnetic-levitation structure including at least a pair of magnetically-attractable bars, such as iron bars or steel bars, which are disposed in relation to the magnets in such a manner that the magnetic force acting on the first magnetically-attractable bar is equal in magnitude and opposite in direction to the magnetic force acting on the second magnetically-attractable bar, thereby allowing the actuator to be restored to its neutral position after a focusing and tracking operation is completed.

8 Claims, 3 Drawing Sheets

17a,17b

OPTICAL PICKUP ACTUATOR WITH MAGNETIC LEVITATION STRUCTURE

BACKGROUND OF THE INVENTION

1. Field of the Invention

This invention relates in general to an optical pickup actuator (also referred to as objective-lens driving unit) for use on an optical disc drive to drive an objective lens used for focusing and tracking of a laser beam used to read data from an optical disc. More particularly, the invention relates to an optical pickup actuator with a magnetic-levitation structure which can allow the actuator to be restored to and then remain stably at its neutral position after a focusing and tracking operation is completed.

2. Description of Related Art

Optical discs are a mass storage medium that can store a large amount of digital data thereon, which can be read by using optical disc drives. An optical disc drive is provided with an optical pickup (read/write head) for reading the data stored on an optical disc. During read operation, the optical pickup should be capable of focusing a laser beam precisely on the target track where the data to be read out are located. An objective lens is used for the focusing purpose. A driving unit (or called actuator) is used to move the objective lens in various directions during the focusing and tracking operations to bring the laser beam into focused and tracked condition. Defocusing and mistracking of the laser beam are usually caused by deviations and oscillations of the optical disc being read. The actuator should have the following features: (1) high sensitivity; (2) good dynamic characteristics, such as the capability to maintain stable operation in high-frequency regions; and (3) compact in size and low in manufacturing cost.

Among conventional optical pickup actuators, the shaft/sleeve rotary type is the most widely used. During read operation, the actuator should be able to remain at the neutral position after the focusing and tracking operation is completed. The gravitation is the major factor that would pull the actuator away from the neutral position. In order to allow the actuator to remain at the neutral position, one conventional design scheme is to provide an elastic support on the actuator. One example of this design scheme is disclosed in the U.S. Pat. No. 4,792,935. One drawback to this design scheme, however, is that it would increase the structural complexity of the actuator. Another conventional design scheme is to provide a magnetic means to support the actuator at the neutral position. One example of this design scheme is disclosed in the U.S. Pat. No. 4,998,802 "OBJECTIVE LENS DRIVING DEVICE IN AN OPTICAL PICKUP" to Kasuga. In this patent, a pair of thin iron plates are fixedly mounted between two magnetic poles that can exert magnetic forces of equal magnitude and opposite directions on the thin iron plates to thereby maintain the actuator at the neutral position. One drawback to this design scheme, however, is that, the magnetic forces from the two magnetic poles can be easily unbalanced due to uneven magnetization on the magnetic poles. Should this be the case, the unbalanced magnetic forces acting on the thin iron plates will cause the actuator to be urged against its shaft axis, thus causing frictional force to the shaft that would degrade the performance of the actuator.

SUMMARY OF THE INVENTION

It is therefore an objective of the present invention to provide an optical pickup actuator with a magnetic-levitation structure which can allow the actuator to be restored to and then remain stably at its neutral position after a focusing and tracking operation is completed without the need to provide an elastic member, so that the structural complexity of the actuator can be decreased.

It is another an objective of the present invention to provide an optical pickup actuator with a magnetic-levitation structure which allows the optical pickup actuator to be simpler in structural complexity and thus easier to assemble as compared to the prior art that utilizes an elastic support.

In accordance with the foregoing and other objectives of the present invention, an optical pickup actuator with an improved magnetic-levitation structure for use on an optical disc drive is provided. The actuator utilizing the invention includes the following constituent parts: a lens holder for holding the objective lens; a shaft axially coupled to said lens holder; a plurality of magnets for producing magnetic fields; a focusing coil which interacts with the magnetic fields from said magnets when excited to thereby produce a magnetic force that move said lens holder along said shaft to perform a focusing action; a tracking coil which interacts with the magnetic fields from said magnets when excited to thereby produce a magnetic torque that rotate said lens holder about said shaft to perform a tracking action; and a magnetic-levitation structure including at least a first magnetically-attractable bar and a second magnetically-attractable bar.

It is a characteristic part of the invention that the magnetically-attractable bars are disposed in relation to the magnets in such a manner that the magnetic force acting on the first magnetically-attractable bar is equal in magnitude and opposite in direction to the magnetic force acting on the second magnetically-attractable bar, thereby allowing the actuator to be restored to and then remain stably at its neutral position after a focusing and tracking operation is completed.

BRIEF DESCRIPTION OF DRAWINGS

The invention can be more fully understood by reading the following detailed description of the preferred embodiments with reference made to the accompanying drawings, wherein.

DETAILED DESCRIPTION OF PREFERRED EMBODIMENTS

Figure 1:
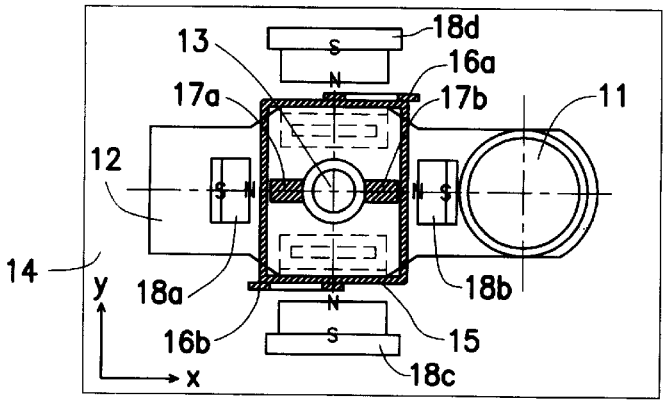
FIG. 1 is a schematic top view of an optical pickup which utilizes the actuator with a magnetic-levitation structure according to the invention.

The optical pickup actuator with a magnetic-levitation structure in accordance with the invention is specifically designed for use on an optical disc drive to perform focusing and tracking operations. FIG. 1 is a schematic top view of an optical pickup which utilizes such an actuator. As shown, the actuator is mounted on a voice-ring motor yoke 14 to drive an objective lens 11. The actuator includes a lens holder 12 for holding the objective lens 11, a shaft 13 axially coupled to the lens holder 12, a focusing coil 15, a pair of tracking coils 16a, 16b, a pair of magnetically-attractable bars 17a, 17b (such as iron bars or steel bars), and a set of permanent magnets 18a, 18b, 18c, 18d disposed on four sides of the actuator. The lens holder 12 is movable axially along the shaft 13 and rotatable about the same. The shaft 13 is mounted on the yoke 14. The focusing coil 15 and the tracking coils 16a, 16b are respectively used to drive the lens holder 12 during focusing and tracking operations. The focusing coil 15 is wound around the lens holder 12, with an inner part thereof disposed between the two magnets 18a, 18b; and an outer part thereof disposed between the two magnets 18c, 18d. The tracking coils 16a, 16b are affixed by means of gluing to the focusing coil 15 near the magnets 18c, 18d.

Figure 2:
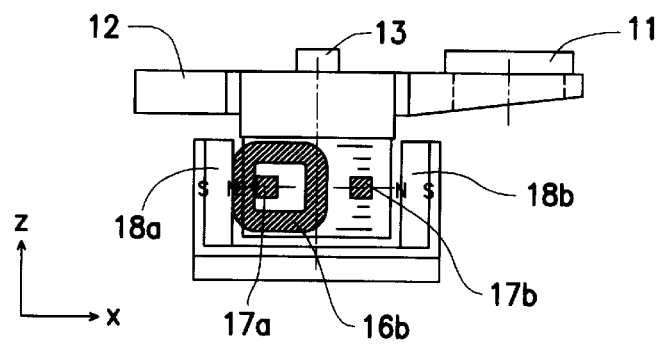
FIG. 2 is a schematic side view of the optical pickup of FIG. 1.

FIG. 2 is a schematic side view of the optical pickup of FIG. 1. As shown, during a focusing operation, an excitation current induced by a focusing error signal is fed into the focusing coil 15, causing the X-axis oriented part of the focusing coil 15 to interact with the Y-axis oriented magnetic field resulted from the magnets 18c, 18d, thus producing a first magnetic force in the Z-direction; and meanwhile causing the Y-axis oriented part of the focusing coil 15 to interact with the X-axis oriented magnetic field resulted from the magnets 18a, 18b, thus producing a second magnetic force also in the Z-direction. The first and second magnetic forces, in combination, move the actuator (and thus the objective lens 11) along the shaft 13 in the Z-direction until focused condition is achieved.

During a tracking operation, excitation currents induced by a tracking error signal are fed into the tracking coils 16a, 16b. Since the tracking coils 16a, 16b are oriented in the Z-direction, the excitation current flowing through the first tracking coil 16a will interact with the Y-axis oriented magnetic field resulted from the magnets 18c, 18d, thereby producing a first magnetic force in the positive X-direction, and meanwhile, the excitation current flowing through the second tracking coil 16b will interact with the X-axis oriented magnetic field resulted from the magnets 18a, 18b, thereby producing a second magnetic force in the negative X-direction. The first and second magnetic forces are equal in magnitude and angular direction $\theta z$, thus producing a torque that rotates the actuator in the angular direction $\theta z$, until the tracked condition is achieved.

The featured magnetic-levitation structure of the optical pickup actuator of the invention is devised in particular to allow the actuator to be restored to and then remain stably at its neutral position after the forgoing focusing and tracking operation is completed. Details of the magnetic-levitation structure will be described in the following with reference to FIGS. 3 and 4 (which are simplified diagrams of FIG. 1 and FIG. 2 respectively, showing only the essential elements related to the magnetic-levitation structure).

Figure 3:
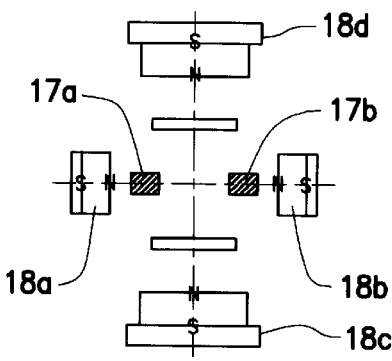
FIG. 3 is a simplified diagram of FIG. 1, which is used particularly to shown the magnetic-levitation structure in the optical pickup that is designed in accordance with the invention.
Figure 4:
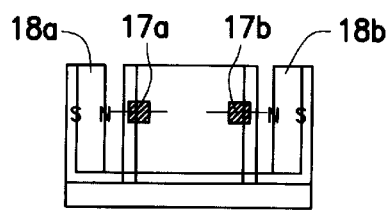
FIG. 4 is a simplified diagram of FIG. 2, which is used particularly to shown the magnetic-levitation structure in the optical pickup that is designed in accordance with the invention.

As shown in FIGS. 3 and 4, the magnetic-levitation structure includes a pair of magnetically-attractable bars 17a, 17b, such as iron bars or steel bars, which are disposed oppositely on the shaft 13 and in lineup with and between the magnets 18a, 18b. The first magnetically-attractable bar 17a is subjected to the magnetic force from the first magnet 18a, while the second magnetically-attractable bar 17b is subjected to the magnetic force from the second magnet 18b. These two attraction forces from the respective magnets 18a, 18b are equal in magnitude but opposite in direction. This allows the magnetically-attractable bars 17a, 17b to be always forced to remain at their fixed positions between the magnets 18a, 18b. As a result, after a focusing and tracking operation is completed, the actuator can be urged by the magnetic forces from the two magnets 18a, 18b back to its neutral position.

Figure 5:
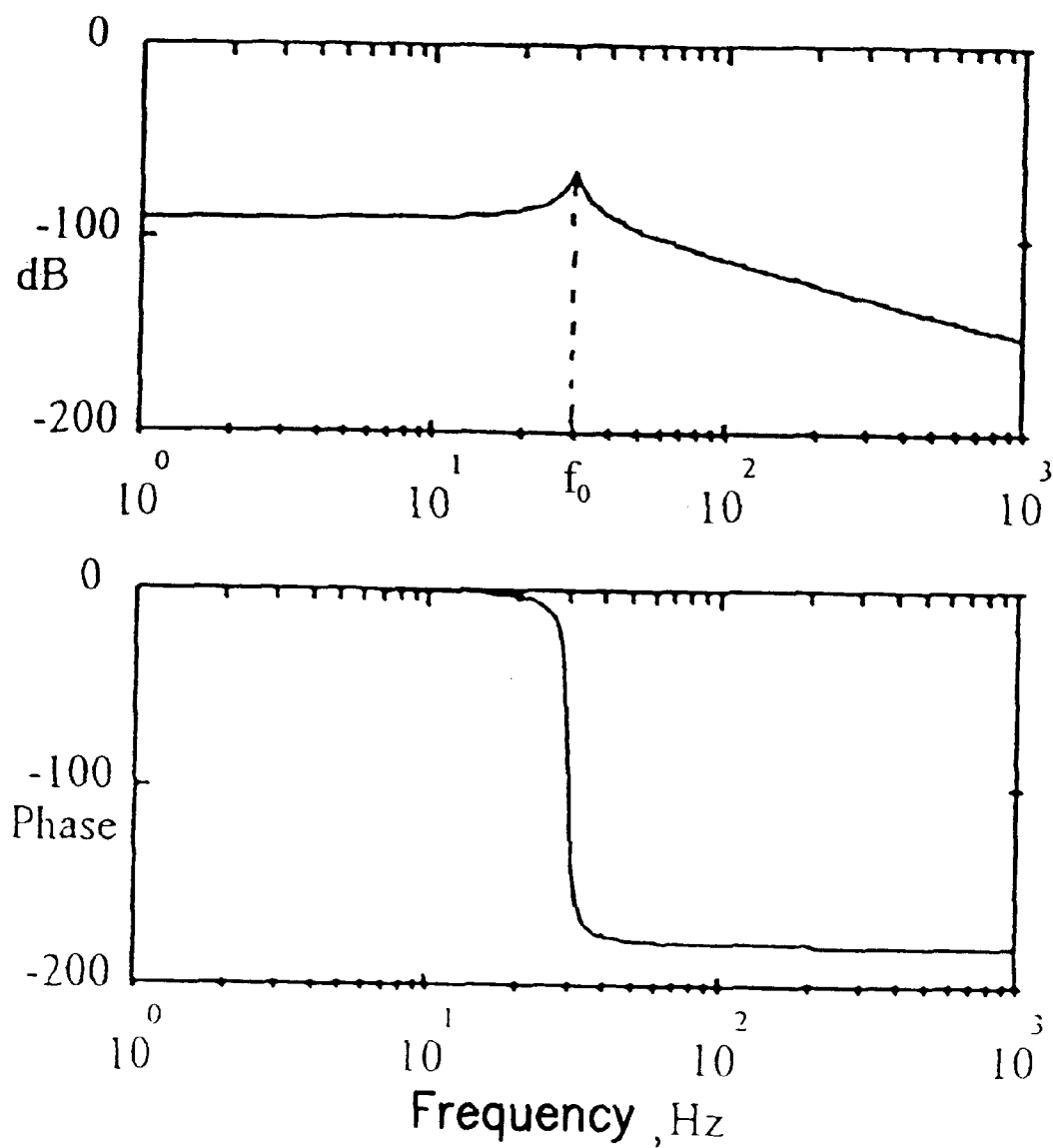
FIG. 5 shows the frequency response characteristics of the actuator when subjected to oscillations in the focusing and tracking directions during the focusing and tracking operation.
Figure 6:
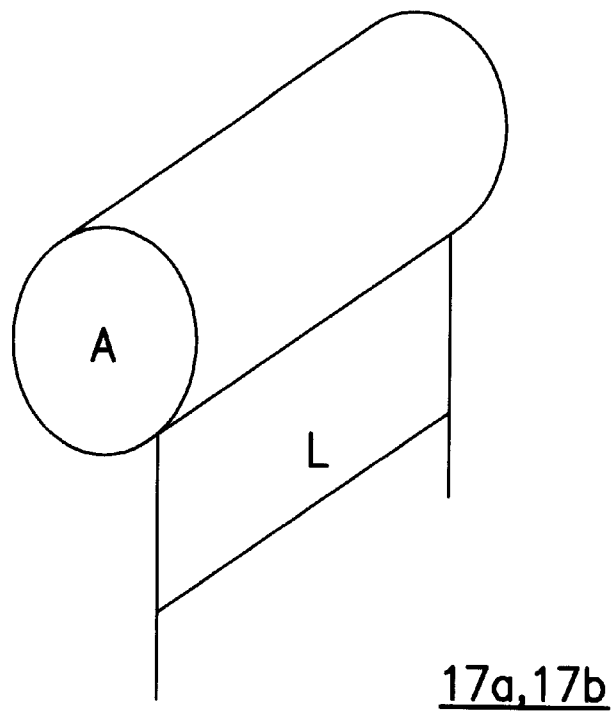
FIG. 6 is a schematic perspective view of a magnetically-attractable bar, such as an iron bar or a steel bar, which is utilized in the magnetic-levitation structure.

Due to the restoring magnetic forces from the magnets in the focusing and tracking directions, the actuator will be subjected to resonant oscillations in both directions (i.e., the Z-direction and Y-direction). FIG. 5 shows the frequency response characteristics of the actuator. Since each of the resonant frequencies in the respective two directions is proportional to the square root of the restoring magnetic force, the resonant frequency f, can be adjusted in three ways: (1) varying the cross-sectional area A of the magnetically-attractable bars 17a, 17b (as shown in FIG. 6); (2) varying the length L of the magnetically-attractable bars 17a, 17b (as shown in FIG. 6); or (3) varying the distance between the magnetically-attractable bars 17a, 17b and the magnets 18a, 18b.

Figure 7:
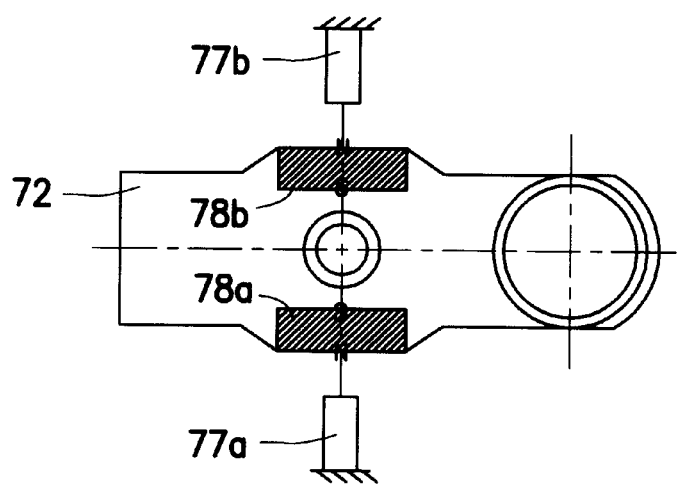
FIG. 7 is a schematic top view showing the application of the magnetic-levitation structure on a moving-magnet actuator.

The foregoing embodiment of the invention is utilized on a shaft/sleeve rotary type of actuator. In addition, the invention can be utilized on a moving-magnet actuator, as disclosed in the following with reference to FIG. 7.

As shown, the moving-magnet actuator includes a lens holder 72 and a pair of permanent magnets 78a, 78b disposed oppositely on the shaft of the lens holder 72. In accordance with the invention, a pair of magnetically-attractable bars 77a, 77b are disposed on opposite outer sides of the magnets 78a, 78b. This arrangement also can allow the lens holder 72 to be restored to its neutral position after a focusing and tracking operation is completed.

In conclusion, the invention has two advantages over the prior art. First, the invention requires the use of just a pair of magnetically-attractable bars to allow the actuator to be restored to its neutral position. The invention is therefore simpler in structural complexity and thus easier to assemble than the prior art (U.S. Pat. No. 4,792,935) which uses an elastic member. Second, in the invention, the magnetically-attractable bars are disposed in a symmetrical manner with respect to the magnets that allows the magnetically-attractable bars to be always balanced at fixed positions, so that the actuator can remain at its neutral position. The invention is therefore more advantageous over the prior art (U.S. Pat. No. 4,998,802).

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An actuator for use on an optical pickup to move an objective lens, comprising:

a lens holder for holding the objective lens;

a shaft axially coupled to said lens holder;

a plurality of magnets for producing magnetic fields, wherein the N and S poles of said magnets are in a direction perpendicular to a longitudinal axis of said shaft;

a focusing coil which has four sides and interacts with the magnetic fields from said magnets when excited to thereby produce a magnetic force that moves said lens holder along said shaft to perform a focusing action, wherein the face of said focusing coil is perpendicular to the longitudinal axis of said shaft, and each side of the focusing coil corresponds to one of said magnets;

a tracking coil which interacts with the magnetic fields from said magnets when excited to thereby produce a magnetic torque that rotates said lens holder about said shaft to perform a tracking action, wherein the face of the tracking coil is parallel to the longitudinal axis of said shaft;

a magnetic-levitation structure including at least a first magnetically-attractable bar and a second magnetically-attractable bar, which are disposed in relation to said magnets in such a manner that the magnetic force acting on said first magnetically-attractable bar is equal in magnitude and opposite in direction to the magnetic force acting on said second magnetically-attractable bar, thereby allowing said actuator to be restored to a neutral position after a focusing and tracking operation is completed.

2. The actuator of claim 1, wherein the resonant frequencies respectively in the focusing and tracking directions are variable by changing the cross-sectional area of said magnetically-attractable bars.

3. The actuator of claim 1, wherein the resonant frequencies respectively in the focusing and tracking directions are variable by changing the length of said magnetically-attractable bars.

4. The actuator of claim 1, wherein the resonant frequencies respectively in the focusing and tracking directions are variable by changing the distance between said magnetically-attractable bars and said magnets.

5. An actuator for use on an optical pickup to move an objective lens, comprising:

a lens holder for holding the objective lens;

a shaft axially coupled to said lens holder;

a plurality of magnets for producing magnetic fields, wherein all of said magnets have N and S poles in a direction perpendicular to a longitudinal axis of said shaft;

a focusing coil which has four sides and interacts with the magnetic fields from said magnets when excited to thereby produce a magnetic force that moves said lens holder along said shaft to perform a focusing action, wherein the face of said focusing coil is perpendicular to the direction of the longitudinal axis of said shaft, and each side of the focusing coil corresponds to one of said magnets;

a tracking coil which interacts with the magnetic fields from said magnets when excited to thereby produce a magnetic torque that rotate said lens holder about said shaft to perform a tracking action, wherein the face of said tracking coil is parallel to the longitudinal axis of said shaft, and the face of the focusing coil and the face of the tracking coil are perpendicular to each other;

a first magnetically-attractable bar and a second magnetically-attractable bar acting as a magnetic-levitation structure, which are disposed in relation to said magnets in such a manner that the magnetic force acting on said first magnetically-attractable bar is equal in magnitude and opposite in direction to the magnetic force acting on said second magnetically-attractable bar, thereby allowing said actuator to be restored to a neutral position after a focusing and tracking operation is completed.

6. The actuator of claim 5, wherein the resonant frequencies respectively in the focusing and tracking directions are variable by changing the cross-sectional area of said magnetically-attractable bars.

7. The actuator of claim 5, wherein the resonant frequencies respectively in the focusing and tracking directions are variable by changing the length of said magnetically-attractable bars.

8. The actuator of claim 5, wherein the resonant frequencies respectively in the focusing and tracking directions are variable by changing the distance between said magnetically-attractable bars and said magnets.

* * * * *